United States Patent [19]
Endfield

[11] 4,442,506
[45] Apr. 10, 1984

[54] PORTABLE WORD-PROCESSOR

[75] Inventor: Cyril Endfield, London, England

[73] Assignee: Microwriter Limited, London, England

[21] Appl. No.: 388,266

[22] Filed: Jun. 14, 1982

Related U.S. Application Data

[60] Division of Ser. No. 188,571, Sep. 18, 1980, Pat. No. 4,360,892, which is a continuation-in-part of Ser. No. 13,824, Feb. 22, 1979, abandoned.

[51] Int. Cl.³ ............................................. G06F 3/023
[52] U.S. Cl. .................................. 364/900; 178/17 C; 178/79; 340/365 S
[58] Field of Search ............... 382/1, 9, 56, 57, 69; 340/365 R, 365 S, 152 R, 311; 364/200, 900; 178/30, 17 R, 17 C, 21, 23 R, 79; 400/91–94; 35/35 A, 38; 179/17

[56] References Cited

U.S. PATENT DOCUMENTS

| | | | |
|---|---|---|---|
| 3,022,878 | 2/1962 | Seibel et al. | 340/365 R |
| 3,428,747 | 2/1969 | Alferieff | 178/17 R |
| 3,833,765 | 9/1974 | Hilborn et al. | 178/79 |
| 3,976,995 | 8/1976 | Sebestyen | 340/365 R |
| 3,980,823 | 9/1976 | Howard | 178/30 |
| 4,007,443 | 2/1977 | Bromberg et al. | 340/365 E |
| 4,042,777 | 8/1977 | Bequaert et al. | 178/79 |
| 4,067,431 | 1/1978 | Whitaker | 340/365 R |
| 4,095,046 | 6/1978 | Frutiger et al. | 178/30 |
| 4,132,976 | 1/1979 | Siegal | 179/90 K |
| 4,159,471 | 6/1979 | Whitaker | 340/146.3 Z |

FOREIGN PATENT DOCUMENTS 1170570 11/1969 United Kingdom .
1292113 10/1972 United Kingdom .
1496522 12/1977 United Kingdom .

Primary Examiner—Leo H. Boudreau
Attorney, Agent, or Firm—LeBland, Nolan, Shur & Nies

[57] ABSTRACT

A portable word-processor comprising the following components; a microprocessor and, connected thereto, a manually operable input chord keyboard having four finger keys and at least one thumb key, the microprocessor being programmed to respond to signals produced by operation of a chord of a combination of up to a maximum of five keys to generate a coded signal representing a particular alpha-numeric character or processing instruction; a display device; output means for connection of the word-processor to a printer; memory means; and an internal power supply connected to power all the aforesaid components; the microprocessor being additionally programmed so as to process the character signals in response to the instruction signals, feed signals to the display device for display of processed characters as an edited text, and to the memory means to store the edited text and print format instruction signals available for transmission through the output means.

9 Claims, 7 Drawing Figures

I 2  J =

K /  L £

M 9  N "

O 0  P 5

PORTABLE WORD-PROCESSOR

RELATED APPLICATION

This application is a division of application Ser. No. 188,571 filed Sept. 18, 1980, now U.S. Pat. No. 4,360,892, which, in turn, is a continuation-in-part of the now abandoned application Ser. No. 13,824 filed Feb. 22, 1979.

FIELD OF INVENTION

This invention relates to a single hand portable electronic word-processor that has a "touch-type" or "chord" keyboard. By "single hand portable" is meant a device which can comfortably be held by one of an operator's hands and operated by the other or supported against a surface and operated by one hand.

BACKGROUND OF THE INVENTION

Known, non-portable word-processors are electronic keyboard devices which can manipulate, or process text input to the device as alpha-numeric characters from a conventional, designated-key keyboard, such as the "Qwerty" keyboard for typewriters, teleprinters and computer terminals, in response to a programme and instructions input to the device via the keyboard and pass the processed text on to printing or other devices.

Any word-processor should include the features of: a "cursor", to enable any part of the text stored in a memory to be displayed; "editing", to enable the insertion, deletion or correction of text; and "print formatting", for the control of a printer for the "lay-out" of edited text when it is printed, such as left and right margin justification and/or tabulation and/or margin indenting and/or end or page pause.

The term "non-portable" is meant, in the context of this description, to be a device which is not self-powered and is not capable of easily being carried from one place to another.

A portable electronic keyboard device is known in the form of a portable teletype machine having a conventional keyboard which will store alpha-numeric character text and typing instructions input to the machine in much the same way as a conventional teleprinter, the machine also having the facility to allow any text in the display to be deleted before it is stored. This facility does not make such a machine a word-processor within the meaning of this description.

Electronic devices are also known having a "touch-type" or "chord" keyboard, wherein a character is input by an operator by the operation of a chord of a combination of one or more keys.

OBJECT OF THE INVENTION

It is an object of the present invention to provide a word-processor of a size that can be held in one of an operator's hands and operated by the other hand. All the usual word-processor features of editing and storing input alpha-numeric text and of controlling the printed format of the edited text, when the word-processor is connected to a printer, are present; together with a keyboard of sufficiently small physical size for such a single hand portable device.

SUMMARY OF THE INVENTION

According to the present invention, a single hand portable word-processor comprises the following components: a micro-processor and, connected thereto, a manually operable input chord keyboard having four finger keys and at least one thumb key, the microprocessor being programmed to respond to signals produced by operation of a chord of a combination of up to a maximum of five keys to generate a coded signal representing a particular alpha-numeric character of processing instruction; a display device; output means for connection of the word-processor to a printer; memory means; and an internal power supply connected to power all the aforesaid components; the micro-processor being additionally programmed so as to process the character signals in response to the instruction signals, feed signals to the display device for display of processed characters as an edited text, and to the memory means to store the edited text and print format instruction signals available for transmission through the output means.

The four finger keys are each positioned so as to be preferentially operated by a particular one of the four fingers of an operator's hand whilst, in a preferred embodiment, two keys are provided and positioned to be convenient to and operated by the operator's thumb. Thus two five-finger keyboards are effectively available and have a sufficient number of combinations to satisfy the input requirements of alpha-numeric characters and processing instructions. Also, such a five finger chord keyboard is of a sufficiently small size for a single hand portable word-processor.

ADVANTAGES OF THE INVENTION

The use of a chord keyboard for the single hand portable word-processor of this invention has produced an unexpected result beyond the mere scaling down in size accorded by modern solid state electronic technology and the natural "hand" size of the five-finger chord keyboard.

Heretofore, the speed of inputting data via the conventional keyboard of a hand-held electronic device, such as the designated keyboard of a pocket calculator, has not been of major relevance to the utility of the device.

However, for a hand-held word-processor to have any real commercial usefulness or utility, it must be capable of being operated at input speeds comparable to that of conventional keyboard machines otherwise it would not be used in everyday commerce or business but would merely be an executive toy.

It has been discovered that the single hand portable word-processor of this invention is capable of being operated at speeds of between 35 and 60 words per minute, i.e. at conventional typing speeds.

Furthermore, the preferred programme for the word-processor includes a pictographic relationship between the key chord or combination to be operated and the majority of the alphabetic characters; this relationship provides a quick learning mnemonic to aid initial acceptance of the word-processor by an operator, who quickly learns to use the word-processor at "reasonable" input speeds. The aforementioned input speeds being, understandably, those of a practised operator.

THE DRAWINGS

FIGS. 4a to d are charts illustrating key-operator codes for alpha-numeric characters and punctuation.

DETAILED DESCRIPTION OF PREFERRED EMBODIMENT

Figure 1:
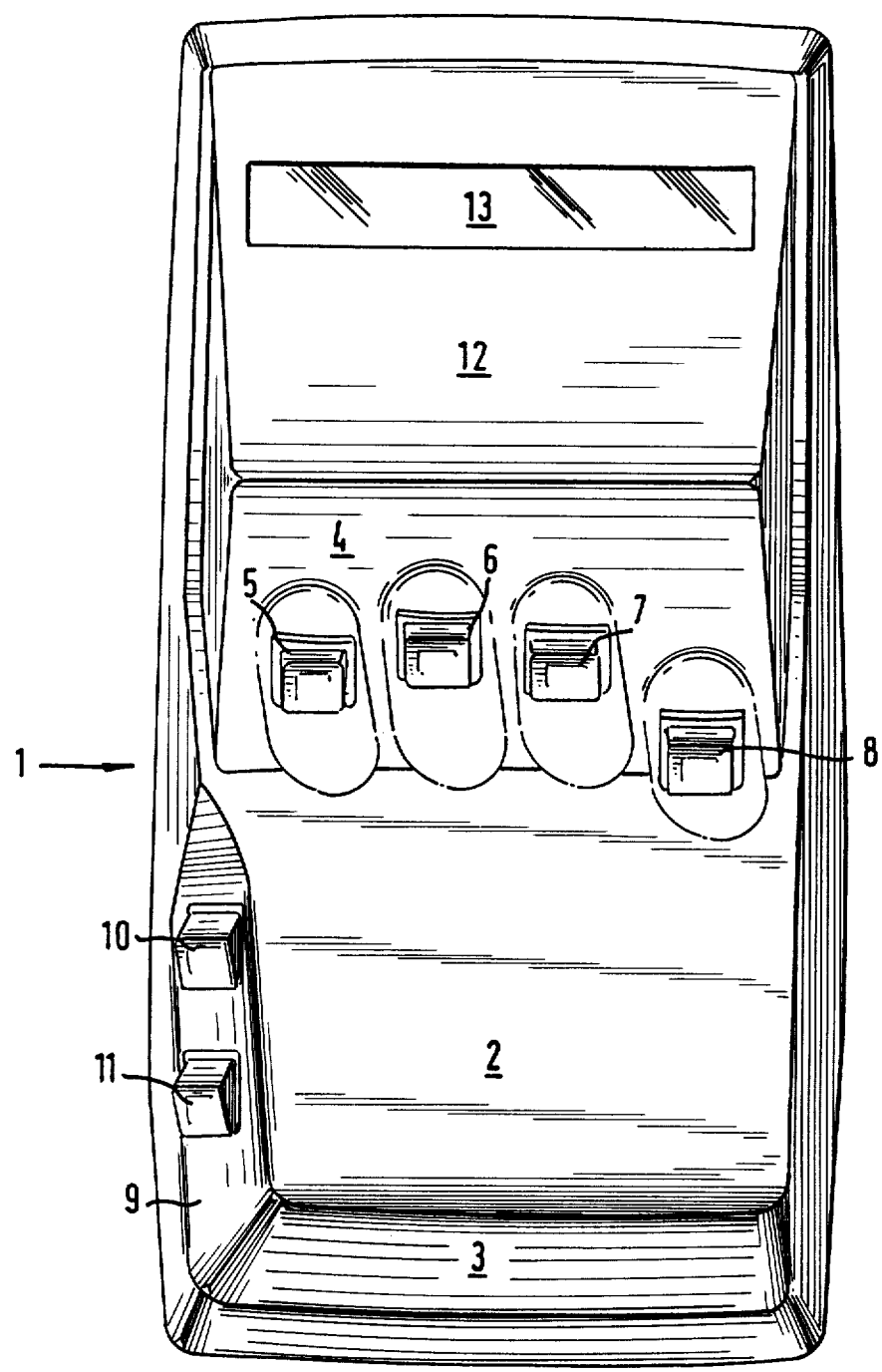
FIG. 1 is a plan view of a single hand portable word-processor in accordance with the invention.
Figure 2:
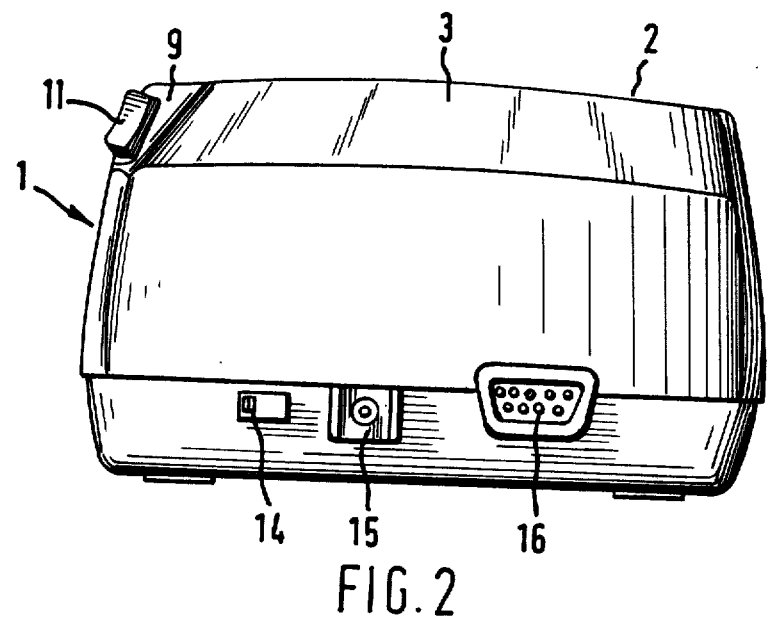
FIG. 2 is an end elevation of the processor of FIG. 1.

The word-processor 1, shown by FIGS. 1 and 2 has a main body part generally in the form of a truncated square pyramid.

The rear face 3 of this pyramid is essentially planar and is intended to be used as a rest for the heel of an operator's hand. The opposite face 4 carries four keys 5, 6, 7 and 8 arranged to be operated solely by the first, index, ring and little fingers respectively of the operator's hand. A side face 9 of the body pyramid 2 carries two further keys 10 and 11, each to be operated by the operator's thumb.

With these two "thumb" keys 10 and 11, two five-key keyboards are produced, each being operable by movement of the fingers and thumb of an operator's right hand without relative movement between that hand and the rest 3. A suitable five-keyed keyboard being described in United Kingdom Patent Specification No. 1496522.

The front face 4 of the main body has a forwardly and upwardly sloping extension 12 that carries an alpha-numeric display 13 that can show characters produced by selective operation of any one key or a combination of up to a maximum of five keys.

Each key consists of a button mounted to operate a conventional micro-switch and, as shown by FIG. 1, the finger keys 5, 6, 7 and 8 are each set in ellipsoidally concave insets in the front face 4. These insets serving to guide and help retain the appropriate finger against the respective finger-key.

As shown by FIG. 2 the rear face 3 of the main body part also contains an ON-OFF switch 14, a Charger Socket 15 and a Data Socket 16.

Figure 3:
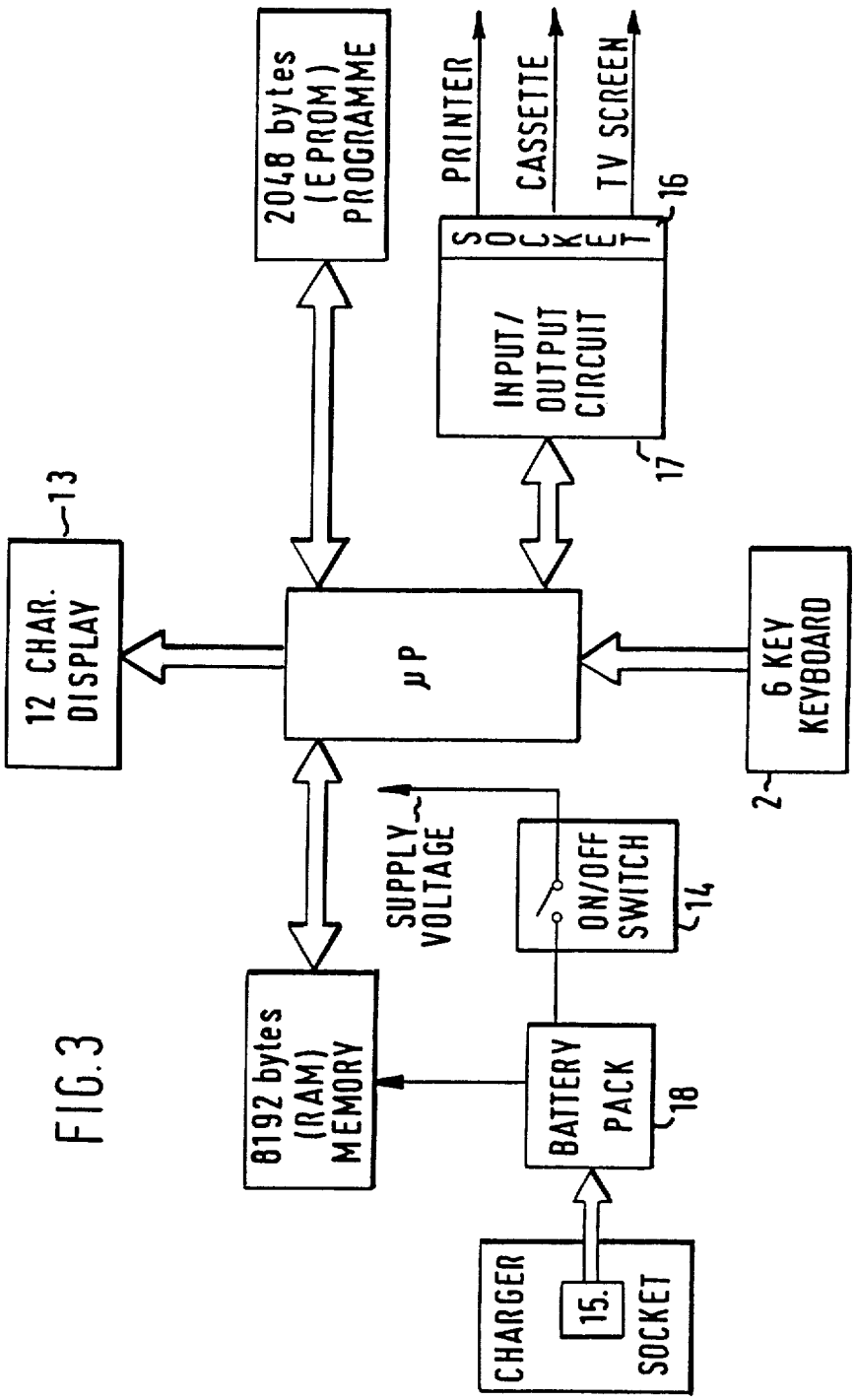
FIG. 3 is a block circuit diagram for the processor.
Figure 4A:
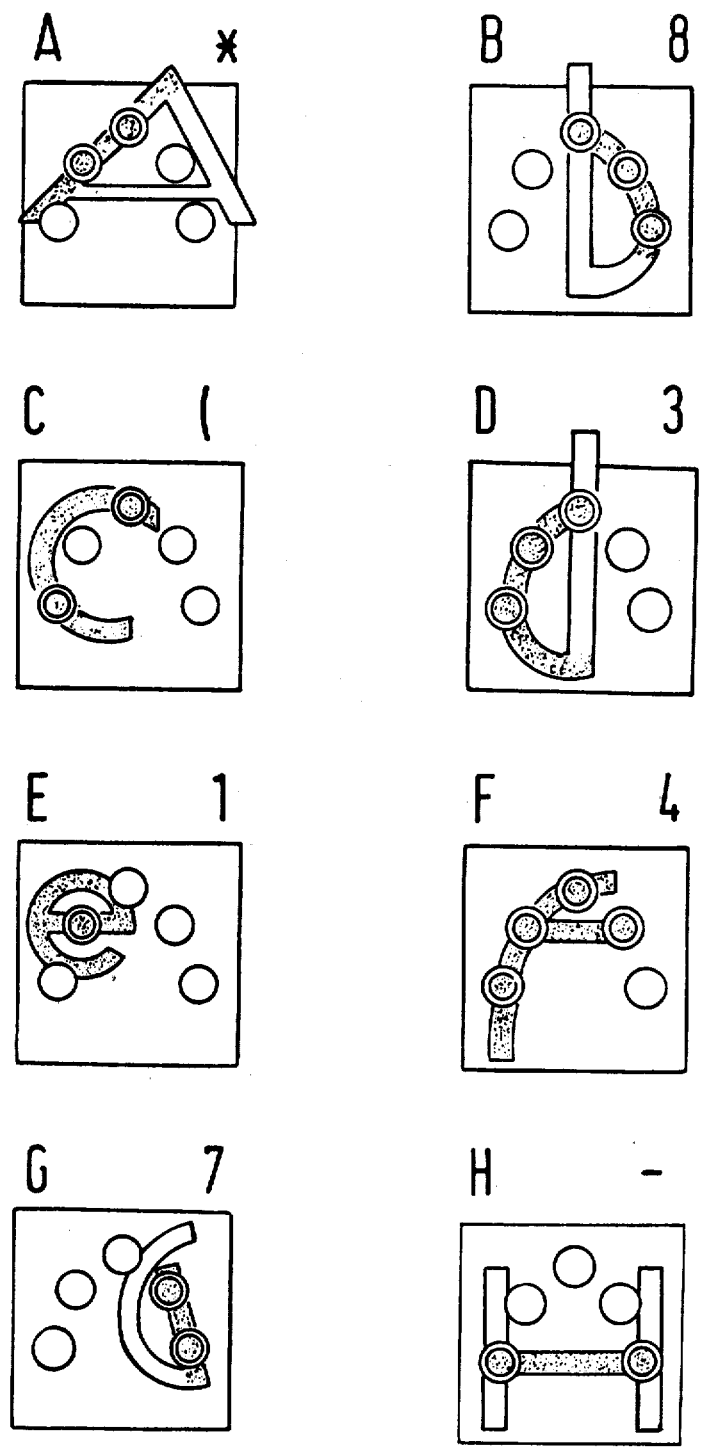
Figure 4B:
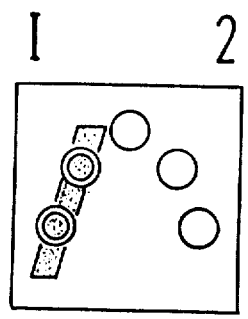
Figure 4B:
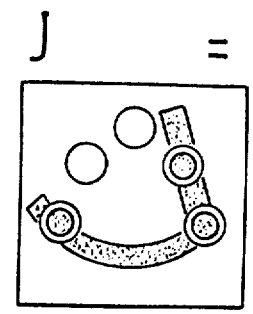
Figure 4B:
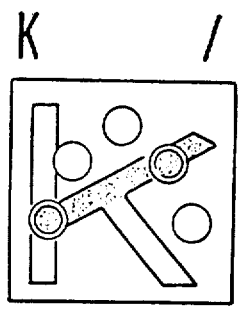
Figure 4B:
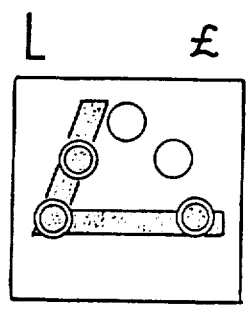
Figure 4B:
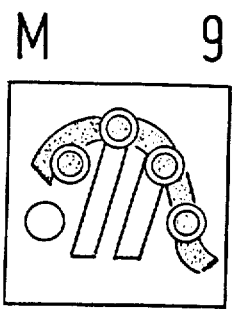
Figure 4B:
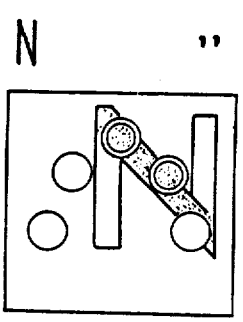
Figure 4B:
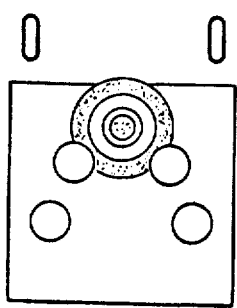
Figure 4B:
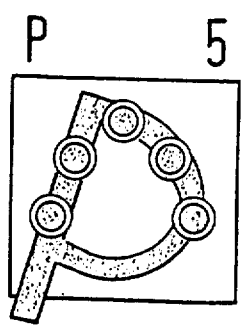
Figure 4C:
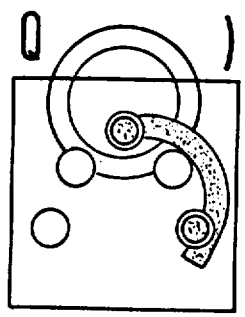
Figure 4C:
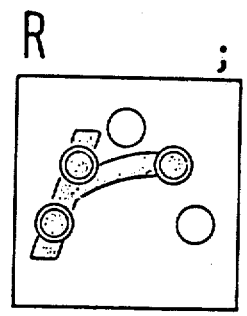
Figure 4C:
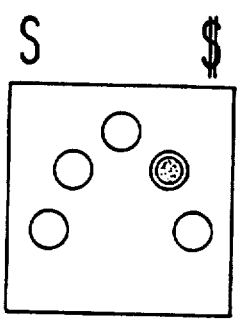
Figure 4C:
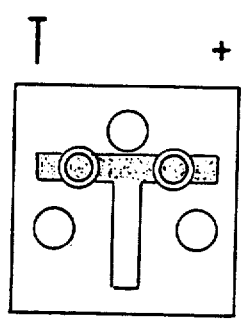
Figure 4C:
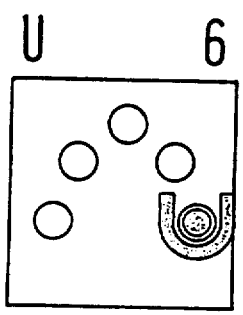
Figure 4C:
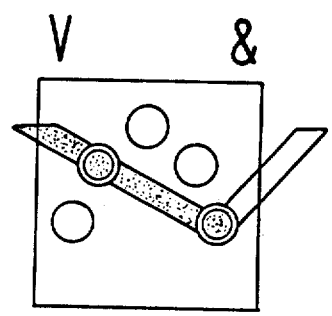
Figure 4C:
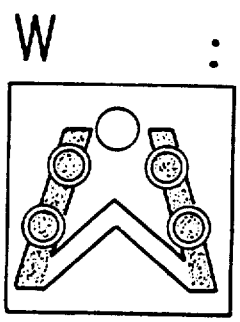
Figure 4C:
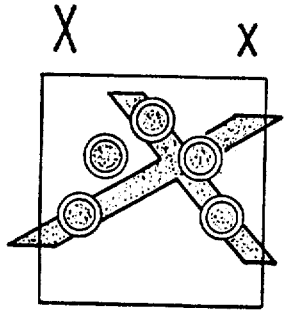
Figure 4D:
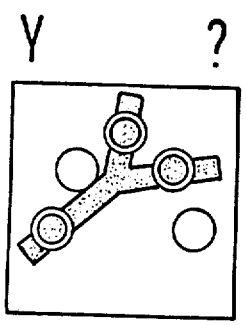
Figure 4D:
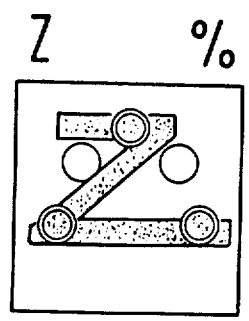
Figure 4D:
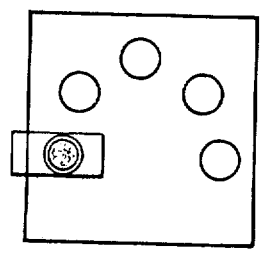
Figure 4D:
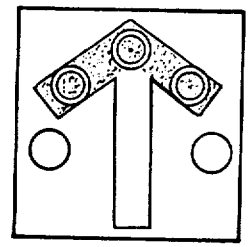
Figure 4D:
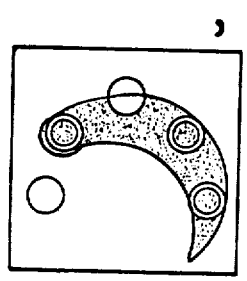
Figure 4D:
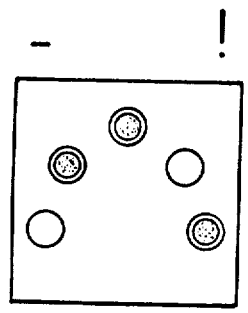
Figure 4D:
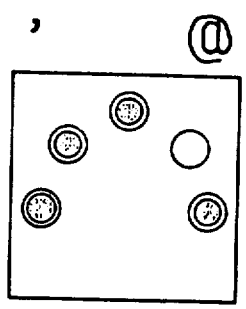

The electronic circuit for the processor is illustrated in block diagram by FIG. 3 which shows a CMOS 8 bit microprocessor $\mu P$ (RCA type CDP 1802) to which are connected the six key keyboard 2, an 8192 byte CMOS RAM memory (8x Toshiba Type TC 5047P), a 12 character alpha-numeric LED display (Litronix Type DL 1416), a 2048 byte CMOS EPROM memory (Intersil Type 1M 6604) and an input/output circuit 17 connected to the DATA socket 16. The input/output circuit is to enable the word-processor to communicate with an external device such as a printer. Other external devices could be a TV or monitor visual display unit or a cassette recorder to provide additional magnetic storage.

The processor is powered from a re-chargeable battery pack 18 connected to the Charger Socket 15. The ON/OFF switch 14 generally controls the supply of power (voltage) to the device with the exception of the RAM memory which has a direct connection to the battery pack 18, by-passing the ON/OFF switch. This effectively renders the RAM memory non-volatile. Thus data can be retained in the RAM memory with the unit switched-off as long as sufficient power remains in the battery pack (this can be up to three weeks).

A resident programme (detailed hereafter) is stored in the EPROM memory that enables the word-processor to operate in the manner to be hereinafter described.

In use, the processor $\mu P$ scans the keyboard micro-switches and starts to assemble a character when any key is depressed (operated). This process continues until all the keys in a particular character code have been released, at which point the assembled code is converted to ASC11, 7 bit code and stored in the memory RAM.

Characters assembled and stored in the memory RAM form a text that can be accessed by keying various control-code characters in order to cause any selected part of the text to be displayed on the display 13, the "cursor"; to edit the text stored in the memory (RAM); or to store completed when the or all the operated keys have been released. Completion of a chord being the condition for the processor to store an assembled code representing a particular character.

FIG. 4 illustrates a particularly suitable operator code for use with the word-processor. The arrangement of the keys corresponding to a given pattern of five points of which a point or points combination lies on the outline of the majority of the alphabet letters of a given type face, the relationship between unique signals produced by operating selected keys or key-combinations and the alphabet letters represented thereby being such that, for such majority of the alphabet, there is a graphic correlation between a letter and the point or points-combination occupied by the key or keys-combination for a chord required to generate the unique signal representing that letter.

The figure shows a series of 31 five-point patterns being the maximum number of ways of combining five points. Each point represents the nominal position of one key being, from left to right, the thumb key 10, the index finger key 5, the middle finger key 6, the ring finger key 7 and the little finger key 8 respectively.

A black point represents a key to be operated and the alphabet letter or other character represented by that print formatting instructions.

The unit's resident programme provides most of the aforesaid editing and print formatting facilities found in conventional, non-portable word-processors.

The resident programme detects low battery voltage and warns the operator with a message (CHARGE-ME) on the display 13. The resident programme also enables the word-processor to communicate, via suitable interfaces, with a number of external devices such as a Daisy wheel printer, a TV or monitor screen display, a dictaphone micro-cassette drive or a Modem/accoustic coupler. The programme permitting operator-defined areas of text stored in the memory RAM to be transmitted through the input/output circuit 17 to an external device connected to the DATA socket 16. In the case of a printer or screen display, the programme automatically formats the text, justifies left and right margins and sets tabs.

The programme also enables text to be read into the memory RAM from an external device connected to the DATA socket.

In scanning the keyboard micro-switches, the microprocessor $\mu P$ is programmed to respond to operative strokes or chords of the keyboard. A chord being defined as the acts of operating and then releasing a single key or the acts of operating the keys of a selected keys-combination, either simultaneously or sequentially, and then releasing the operated keys; the Chord being particular points or points-combination is shown in its pictographic relation, wherever this is possible, with that point or points-combination. These characters that can be entered into the word-processor by simple operation of five keys 10, 5, 6, 7 and 8 are referred to as the alphabet register.

For this alphabet register, operation of the thumb key 10 alone signals a SPACE; finger keys 5, 6 and 7 signals a FULL STOP; finger keys 5, 7 and 8 a COMMA; keys 10 5, 6 and 8 an APOSTROPHE and finger keys 5, 6 and 8 a DASH.

The other thumb key 11 is a control key, the operation of which puts the unit into a punctuation and numeric register. The points codes for punctuation and numbers are also given by FIG. 4. It will be seen that the number codes follow the conventional deaf and dumb sign number system.

Operation of this thumb control key 11 in combination with the four finger keys 5, 6, 7 and 8 provides another five-key keyboard and this second keyboard is used to input control or processing instructions to the work-processor. The control instructions listed below are given by means of codes based on the equivalent alphabet letter codes. For convenience these are denominated by the letter underlined, for example D the code signal produced by operation of the thumb control key 11 with finger keys 5 and 6.

| CONTROL | KEY COMBINATION | DISPLAY |
| --- | --- | --- |
| Register switch | Key 11 | — |
| Upper case: single character | Y; Keys 11, 6, 7 | — |
| Upper case lock | P; Keys 11, 5, 6, 7, 8 | — |
| Unlock upper case | Y, P | — |
| Single space forward | F; Keys 11, 5, 6, 7 | Display advances by one space. |
| Continuous forward read | Y, F | Display reads forward continuously. |
| Single space backward | K; Keys 11, 7 | Display goes back one space. |
| Continuous backward read | Y, K | Display reads backwards continuously. |
| Halt | H; Keys 11, 8 | Display movement stops. |
| Single character deletion | D; Keys 11, 5, 6 | Character on right of display is erased and is replaced by the next character (or space) in the memory. |
| Continuous deletion | Y, D | Above process repeats automatically. |
| Instant deletion | W, W; Keys 11, 5, 7, 8 | Memory deleted between signs > and < |
| Insertion | I; Keys 11, 5 | Flashing symbol on right of display. |
| Cancel insertion | Y, I | Above display ceases. |
| Carriage return | C; Keys 11, 6 | [ |
| Tabulate | R; Keys 11, 5, 7 | |
| Margin in | '; Keys 11, 5, 6, 8 | > (flashing). |
| Cancel margin in | Y, ' | < (flashing) |
| Start printing sign | L; Keys 11, 5, 8 | > |
| Stop print sign | Y, L | < |
| Short zip | Z; Keys 11, 6, 8 | Display jumps ahead by 128 characters or next > sign, whichever is shorter zip. |
| Long zip | Y, Z | Display jumps to next >. |

-continued

| CONTROL | KEY COMBINATION | DISPLAY |
|---|---|---|
| Short jump-back | J; Keys 11, 7, 8 | Display jumps back to previous >. |
| Long jump-back | Y, J | START (of memory). |
| Print (single space) | X; Keys 11, 6, 7, 8 | PRINT. |
| Print (double space) | Y | PRINT. |

THE RESIDENT PROGRAMME

```
0002              *   MICROWRITER PROGRAM LEVEL 0.8
0003              *
0004              *   20/4/79
0005              *
0006              ****************************************
0007              *
0008              *        REGISTER USAGE
0009              *        **************
0010              *
0011              *   0 MAIN PC
0012              *   1 DISPLAY SUBROUTINE ADDRESS
0013              *   2 GET CHARACTER SUBROUTINE ADDRESS
0014              *   3 H - CURSOR MASK(DISP)   L - TEMPORARY LOOP COUN
0015              *       MARGIN (PRINT)            TAB (PRINT)
0016              *   4 GENERAL SUBROUTINE ADDRESS
0017              *   5 PRINTER INTERFACE SUB ADDR (TEMP)
0018              *   6 VDU POINTER
0019              *   7 VDU POINTER
0020              *   8 H - KEY PRESSED STORE   L - LAST KEY CHARACTER
0021              *   9 H - CURS FLAG & DELAY   L - KEY SHIFT MODE
0022              *   A EXTERNAL DELAY
0023              *     H - LINE FEED COUNT     L - CHAR COUNT (PRINT)
0024              *   B
0025              *   C TEMPORARY POINTER (JUMP, DISP, PACK)
0026              *   D ADDRESSES TEMP RAM LOCATION
0027              *   E TEMPORARY POINTER (JUMP, MSG, GETCH, PACK)
0028              *     PRINTER INTERFACE DATA
0029              *   F MEMORY ADDRESS POINTER
0030              *
0031              ****************************************
0032              *
0033              *        RAM MEMORY USAGE
0034              *        ****************
0035              *
0036              *
0037              ****************************************
0038              *
0039 0000                      ORG    0
0040              *
0041              *   REGISTER INITIALISATION
0042              *
0043                 TEMP EQU   :C000
0044                 SOT  EQU   :C010    START OF TEXT MEMORY
0045              *
0046 0000 F8 C0 BD ENTRY LOAD   D, TEMP
     0003 F8 00 AD
0047 0006 F8 C0           LDI   SOT.H   LOAD F,6,7 WITH SOT
0048 0008 BF              PHI   F
0049 0009 B7              PHI   7
0050 000A B6              PHI   6
0051 000B F8 10           LDI   SOT.L
0052 000D AF              PLO   F
0053 000E A7              PLO   7
0054 000F A6              PLO   6
0055 0010 F8 03 B1        LOAD  1,DISP  SUBROUTINE ADDRESSES
     0013 F8 6C A1
0056 0016 F8 02 B2        LOAD  2,GETCH
     0019 F8 76 A2
0057 001C F8 00           LDI   0
0058 001E B8              PHI   8
0059 001F A9              PLO   9
0060 0020 B9              PHI   9
0061              *
```

```
0062 0021    E0              SEX   0
0063 0022    67              OUT   7
0064 0023    00              DATA  0
0065                    *
0066 0024    F8 02 B4        LOAD  4,MSG
     0027    F8 65 A4
0067 002A    F8 40 BE        LOAD  E,:400B   DISPLAY
     002D    F8 0B AE
0068 0030    D4              SEP   4         WRITE TO DISPLAY
0069 0031                    ASCI  1
0070 0031    CD C9 C3        DATA  'MICRO-WRITER'
     0034    D2 CF AD
     0037    D7 D2 C9
     003A    D4 C5 D2
0071 003D    F8 C0 BE        LOAD  L,SOT
     0040    F8 10 AE
0072 0043    D4              SEP   4         PUT START IN MEMORY
0073 0044                    ASCI  0
0074 0044    20 20 20        DATA  '    trats '
     0047    20 20 20
     004A    74 72 61
     004D    74 73 20
0075                    *
0076 0050    D2         WFS  SEP   2         WAIT FOR A CHARACTER
0077 0051    32 50           BZ    WFS
0078 0053    30 6A           BR    MAIN2
0079                    *
0080                    * START
0081                    *
0082 0055    F8 C0 BF  START LOAD  F,SOT
     0058    F8 10 AF
0083 005B    9F         VSTRT GHI  F         COPY F TO 6&7 FOR VDU
0084 005C    B6              PHI   6
0085 005D    B7              PHI   7
0086 005E    8F              GLO   F
0087 005F    A6              PLO   6
0088 0060    A7              PLO   7
0089 0061    L0         MAIN SEX   0
0090 0062    62              OUT   2
0091 0063    00              DATA  0
0092 0064    3F 77           BN4   LBATT    TEST FOR BATTERY LOW
0093 0066    D1         MAIN1 SEP  1        DISPLAY
0094 0067    D2              SEP   2        GET CHARACTER
0095 0068    32 61           BZ    MAIN
0096 006A    FE         MAIN2 SHL
0097 006B    33 6D           BDF   MCONT    CONTROL ?
0098 006D    1F              INC   F
0099 006E    9F              GHI   F
0100 006F    FD E0           SDI   :E0      END OF MEMORY ?
0101 0071    32 9C           BZ    MFULL
0102 0073    88         MSTORE GLO 8        GET CHAR
0103 0074    5F              STR   F
0104 0075    30 61           BR    MAIN
0105                    *
0106 0077    8A         LBATT GLO  A        TEST IF EXT DELAY 0
0107 0078    3A 66           BNZ   MAIN1
0108 007A    EA              PHI   A
0109 007B    F8 02 B4   LB1  LOAD  4,MSG    YES - DISPLAY MESSAGE
     007E    F8 65 A4
0110 0081    F8 40 BE        LOAD  E,:400B
     0084    F8 0B AE
0111 0087    D4              SEP   4
0112 0088                    ASCI  1
0113 0088    C3 C8 C1        DATA  'CHARGE ME'
     008B    D2 C7 C5
     008E    A0 CD C5
     0091    A0 A0 A0
0114 0094                    ASCI  0
0115 0094    2A              DEC   A
0116 0095    9A              GHI   A
0117 0096    FF FA           SMI   :FA      COUNT OF :FA00
0118 0098    3A 7B           BNZ   LB1
0119 009A    30 66           BR    MAIN1    LOW A IS 0 FOR EXTERNAL DELAY
0120                    *
0121 009C    2F         MFULL DEC  F
0122 009D    F8 02 B4        LOAD  4,MSG
     00A0    F8 65 A4
0123 00A3    F8 40 BE        LOAD  E,:400B
```

```
           00A6  F8 0B AE
0124  00A9  D4                    SEP   4
0125  00AA                        ASCI  1
0126  00AA  CD C5 CD              DATA  'MEMORY FULL'
      00AD  CF D2 D9
      00B0  A0 C6 D5
      00B3  CC CC A0
0127  00B6                        ASCI  0
0128  00B6  D2            MFI     SEP   2              WAIT FOR HALT
0129  00B7  FB FF                 XRI   :FF
0130  00B9  3A B6                 BNZ   MFI
0131  00BB  30 61                 BR    MAIN
0132                       *
0133  00BD  FE            MCONT   SHL
0134  00BE  33 61                 BDF   MAIN           HALT ?
0135  00C0  F6                    SHR
0136  00C1  5D                    STR   D              SAVE VALUE IN TEMP
0137  00C2  ED                    SEX   D
0138  00C3  F8 00 BE              LOAD  E,JMPT         SET UP FOR JUMP TABLE
      00C6  F8 CA AE
0139  00C9  DE                    SEP   E
0140  00CA  F8 D9         JMPT    LDI   JTABL.L
0141  00CC  F4                    ADD
0142  00CD  AC                    PLO   C
0143  00CE  F8 00                 LDI   JTABL.H
0144  00D0  7C 00                 ADCI  0
0145  00D2  BC                    PHI   C    C CONTAINS ADDRESS OF ENTRY IN
                                                              JUMP TABLE
0146  00D3  EC                    SEX   C
0147  00D4  72                    LDXA
0148  00D5  E0                    PHI   0
0149  00D6  F0                    LDX
0150  00D7  A0                    PLO   0   0 CONTAINS JUMP ADDRESS
0151  00D8  D0                    SEP   0   AND OFF WE GO
0152                       *
0153  00D9  01 0B         JTABL   DD    RACKS
0154  00D1  01 58                 DD    BACKC
0155  00DD  01 44                 DD    ZIPB
0156  00DF  00 55                 DD    START
0157  00E1  01 16                 DD    ZIPS
0158  00E3  01 1A                 DD    ZIP
0159  00E5  03 E2                 DD    PRIN1
0160  00E7  03 E6                 DD    PRIN2
0161  00E9  02 00                 DD    INSRT
0162  00EE  06 87                 DD    CASSR
0163  00ED  01 9B                 DD    WIPE
0164  00EF  06 2L                 DD    CASSW
0165  00F1  01 C8                 DD    DELS
0166  00F3  01 D3                 DD    DELC
0167  00F5  00 F9                 DD    FORWS
0168  00F7  01 50                 DD    FORWC
0169                       *
0170                       * FORWARDS SINGLE
0171                       *
0172  00F9  F8 01 B4      FORWS   LOAD  4,INCPT        SUBR CALL
      00FC  F8 74 A4
0173  00FF  D4                    SEP   4
0174  0100  C4                    NOP
0175  0101  C4                    NOP                  VALID CHAR
0176  0102  0F            VTST    LDN   F
0177  0103  FB 3E                 XRI   '>'            START ?
0178  0105  CA 00 61              LBNZ  MAIN
0179  0108  C0 00 5B              LBR   VSTRT
0180                       *
0181                       * BACKWARDS SINGLE
0182                       *
0183  010B  F8 01 B4      BACKS   LOAD  4,DECPT
      010E  F8 87 A4
0184  0111  D4                    SEP   4
0185  0112  C4                    NOP
0186  0113  C4                    NOP
0187  0114  30 02                 BR    VTST
0188                       *
0189                       * ZIP
                           *
0191  0116  F8 80         ZIPS    LDI   128            LIMIT OF ZIP CHARS
0192  0118  30 1C                 BR    ZIP1
0193  011A  F8 00         ZIP     LDI   0              NO LIMIT
```

```
0194 011C  A3           ZIP1  PLO  3
0195 011D  F8 00              LDI  0
0196 011F  B3                 PHI  3
0197 0120  1F           ZLP   INC  F           TEST FOR EOM
0198 0121  9F                 GHI  F
0199 0122  FD E0               SDI  :E0
0200 0124  C2 00 55     ZX1   LBZ  START       YES
0201 0127  0F                 LDN  F
0202 0128  FB 3E              XRI  :3E         START CODE ?
0203 012A  32 35              BZ   ZX
0204 012C  23                 DEC  3           DECREMENT LOOP COUNT
0205 012D  83                 GLO  3           TEST
0206 012E  3A 20              BNZ  ZLP
0207 0130  93                 GHI  3
0208 0131  3A 20              BNZ  ZLP
0209 0133  30 41              BR   ZX2         COUNT EXPIRED
0210 0135  9F           ZX    GHI  F           START CODE
0211 0136  B7                 PHI  7           COPY F TO 6&7
0212 0137  B6                 PHI  6
0213 0138  8F                 GLO  F
0214 0139  A6                 PLO  6
0215 013A  A7                 PLO  7
0216 013B  1F                 INC  F
0217 013C  1F                 INC  F
0218 013D  1F                 INC  F           MOVE TO CENTRE OF DISPLAY
0219 013E  1F                 INC  F
0220 013F  1F                 INC  F
0221 0140  1F                 INC  F
0222 0141  C0 00 61     ZX2   LBR  MAIN        COUNT EXPIRED
0223
0224                    * ZIP BACK
0225                    *
0226 0144  F8 01 B4     ZIPB  LOAD 4, DECPT
     0147  F8 87 A4
0227 014A  D4           ZBLP  SEP  4,
0228 014B  30 4A              BR   ZBLP
0229 014D  C0 00 5B           LBR  VSTRT
0230                    *
0231                    * FORWARD CONTINUOUS
0232                    *
0233 0150  F8 01 B4           FORWC LOAD 4,INCPT
     0153  F8 74 A4
0234 0156  30 60              BR   CONT
0235                    *
0236                    * BACKWARD CONTINUOUS
0237                    *
0238 0158  F8 01 B4           BACKC LOAD 4, DECPT
     015B  F8 87 A4
0239 015E  30 60              BR   CONT
0240
0241
0242                    * CONTINUOUS MODE
0243                    *
0244 0160  F8 02        CONT  LDI  2
0245 0162  AA                 PLO  A           SET EXT DELAY
0246 0163  D4                 SEP  4           CALL INC OR DEC POINTER
0247 0164  30 68              BR   CNL1        VALID CHAR - CONTINUE
0248 0166  30 02        CNLM  BR   VTST        START OR END
0249 0168  D1           CNL1  SEP  1           CALL DISPLAY
0250 0169  8A                 GLO  A           GET EXT DELAY
0251 016A  32 60              BZ   CONT        DELAY OVER ?
0252 016C  D2                 SEP  2           CALL GET CHAR
0253 016D  FF FF              SM1  :FF         HALT?
0254 016F  3A 68              BMZ  CNL1
0255 0171  30 66              BR   CNLM        YES
0256                    *
0257                    * INCREMENT POINTER
0258                    * NORMALLY GIVES SHORT RETURN
0259                    * AT END CODE OR END OF MEMORY GIVES LONG RETURN
0260                    *
0261 0173  D0           IPEX  SEP  0
0262 0174  1F           INCPT INC  F           INC MEMA
0263 0175  9F                 GHI  F
0264 0176  FD E0              SDI  :E0         END OF MEMORY ?
0265 0178  32 83              BZ   IP1         YES
0266 017A  0F                 LDN  F           NO - GET CHAR VIA MEMA
0267 017B  FD 3C              SDI  :3C         END CODE ?
0268 017D  3A 73              BNZ  IPEX
```

```
0269 017F 10          IP2   INC  0           YES
0270 0180 10                INC  0           BUMP RETURN
0271 0181 30 73             BR   IPEX
0272 0183 2F          IP1   DEC  F           DECR MEMA
0273 0184 30 7F             BR   IP2
0274                  *
0275                  * DECREMENT POINTER
0276                  * NORMALLY GIVES SHORT RETURN
0277                  * AT START CODE OR START OF MEMORY GIVES LONG
                                                                 RETURN
0278                  *
0279 0186 D0          DPEX  SEP  0
0280 0187 9F          DECPT GHI  F
0281 0188 FD C0             SDI  SOT.H       START OF MEMORY ?
0282 018A 3A 91             BNZ  DP1
0283 018C 8F                GLO  F
0284 018D FD 10             SDI  SOT.L       START OF MEMORY ?
0285 018F 32 97             BZ   DP2
0286 0191 2F          DP1   DEC  F
0287 0192 0F                LDN  F           GET CHAR
0288 0193 FD 3E             SDI  :3E         START CODE ?
0289 0195 3A 99             BNZ  DP3
0290 0197 10          DP2   INC  0
0291 0198 10                INC  0           BUMP RETURN
0292 0199 30 86       DP3   BR   DPEX
0293                  *
0294                  * WIPE
0295                  *
0296 019B D2          WIPE  SEP  2           GET CHARACTER
0297 019C 32 9B             BZ   WIPE
0298 019E FB 8A             XRI  :8A         REPEATED CONTROL - W ?
0299 01A0 CA 00 61          LBNZ MAIN
0300 01A3 F8 01 B4          LOAD 4, DECPT
     01A6 F8 87 A4
0301 01A9 D4          WBLP  SEP  4           LOOK BACK FOR START
0302 01AA 30 A9             BR   WBLP
0303 01AC 0F                LDN  F
0304 01AD FB 3E             XRI  :3E         START CODE ?
0305 01AF 32 B2             BZ   WIPE1
0306 01B1 1F                INC  F           NO - MUST BE SOT
0307 01B2 8F          WIPE1 GLO  F           TRANSFER MEMORY POINTER TO E
0308 01B3 AE                PLO  E
0309 01B4 9F                GHI  F
0310 01B5 BE                PHI  E
0311 01B6 0E          WLP   LDN  E           GET CHARACTER
0312 01B7 FB 3C             XRI  :3C         END CODE ?
0313 01B9 32 C4             BZ   WEND
0314 01BB F8 00             LDI  0           NO
0315 01BD 5E                STR  E           CLEAR CHARACTER
0316 01BE 1E                INC  E
0317 01BF 9E                GHI  E
0318 01C0 FD E0             SDI  :E0         END OF MEMORY ?
0319 01C2 3A B6             BNZ  WLP
0320 01C4 5E          WEND  STR  E
0321 01C5 2F                DEC  F
0322 01C6 30 E8             BR   PACKJ
0323                  *
0324                  * DELETE SINGLE
0325                  *
0326 01C8 F8 01 B4    DELS  LOAD 4,DEL
     01CB F8 EC A4
0327 01CE D4                SEP  4
0328 01CF 30 E8             BR   PACKJ
0329 01D1 30 E8             BR   PACKJ
0330                  *
0331                  * DELETE CONTINUOUS
0332                  *
0333 01D3 F8 01 B4    DELC  LOAD 4,DEL
     01D6 F8 EC A4
0334 01D9 F8 02       DELC1 LDI  2
0335 01DB AA                PLO  A           EXT DELAY
0336 01DC D4                SEP  4
0337 01DD 30 E8             BR   PACKJ
0338 01DF D1          DELC2 SEP  1           DISPLAY
0339 01E0 8A                GLO  A           EXT DELAY
0340 01E1 32 D9             BZ   DELC1
0341 01E3 D2                SEP  2           GETCH
0342 01E4 FF FF             SMI  :FF         HALT ?
```

```
0343 01E6  3A DF             BNZ   DELC2
0344 01E8  C0 02 49  PACKJ   LBR   PACK
0345                *
0346                * DELETE ROUTINE
0347                *
0348 01EB  D0        DELEX   SEP   0
0349 01EC  9F        DEL     GHI   F
0350 01ED  FD C0             SDI   SOT.H    TEST START OF MEMORY
0351 01EF  3A F8             BNZ   DEL1
0352 01F1  8F                GLO   F
0353 01F2  FD 10             SDI   SOT.L
0354 01F4  3A F8             BNZ   DEL1
0355 01F6  30 EB             BR    DELEX
0356 01F8  F8 00     DEL1    LDI   0
0357 01FA  5F                STR   F        CLEAR CHARACTER
0358 01FB  2F                DEC   F
0359 01FC  10                INC   0
0360 01FD  10                INC   0        LONG RETURN
0361 01FE  30 EB             BR    DELEX
0362                *
0363                ***********************************************
0364                *  INSERT
0365                *
0366                *  OPENS A GAP
0367                *  ACCEPTS INPUT TEXT
0368                *  MEMORY CONTENTS ARE THEN PACKED DOWN
0369                *
0370 0200  F8 FF     INSRT   LDI   :FF      C & E TO END OF MEMORY
0371 0202  AC                PLO   C
0372 0203  AE                PLO   E
0373 0204  F8 DF             LDI   :DF
0374 0206  BC                PHI   C
0375 0207  BE                PHI   E
0376 0208  ED                SEX   D
0377 0209  8F        PULP    GLO   F        HAS C REACHED F YET ?
0378 020A  5D                STR   D
0379 020B  8C                GLO   C
0380 020C  F7                SM
0381 020D  3A 15             BNZ   PU1
0382 020F  9F                GHI   F
0383 0210  5D                STR   D
0384 0211  9C                GHI   C
0385 0212  F7                SM
0386 0213  32 22             BZ    INSLP    YES - PACK UP COMPLETED
0387 0215  0C        PU1     LDN   C        GET CHARACTER THROUGH C
0388 0216  32 1F             BZ    PU2
0389 0218  5D                STR   D        SAVE
0390 0219  F8 00             LDI   0
0391 021B  5C                STR   C        CLEAR CHARACTER
0392 021C  0D                LDN   D
0393 021D  5E                STR   E        STOKE THROUGH E
0394 021E  2E                DLC   E
0395 021F  2C        PU2     DEC   C
0396 0220  30 09             BR    PULP
0397                *
0398 0222  1F        INSLP   INC   F
0399 0223  9F                GHI   F
0400 0224  FD E0             SDI   :E0      END OF MEMORY ?
0401 0226  C2 00 9C          LBZ   MFULL
0402 0229  0F                LDN   F
0403 022A  CA 00 9C          LBNZ  MFULL    TEST FOR MEMORY CLEAR
0404 022D  F8 01             LDI   1        FLASHING SPACE
0405 022F  5F                STR   F
0406 0230  D1        INSL1   SEP   1        DISPLAY
0407 0231  D2                SEP   2        GET CHAR
0408 0232  32 30             BZ    INSLI
0409 0234  FE                SHL              SHIFT TO
0410 0235  33 3B             BDF   INSC     TEST FOR CONTROL
0411 0237  88                GLO   8        NO, GET CHARACTER
0412 0238  5F                STR   F        AND STORE
0413 0239  30 22             BR    INSLP
0414 023B  FB 12     INSC    XRI   :12      SHIFTED READ CASSETTE
0415 023D  C2 06 86          LBZ   CASSI
0416 0240  88                GLO   8
0417 0241  FB FE             XRI   :FE      END INSERT
0418 0243  3A 30             BNZ   INSL1    IGNORE OTHER CONTROL CODES
0419 0245  5F                STR   F        REPLACE FLASHING SPACE
0420 0246  2F                DEC   F
```

```
0421 0247 30 49              BR    PACK
0422                    *
0423                    * PACK
0424                    * PACKS DOWN MEMORY CONTENTS, REMOVING ZEROS
0425                    *
0426 0249 F8 C0   PACK   LDI   SOT.H   PUT SOT IN C & E
0427 024B BC             PHI   C
0428 024C BE             PHI   E
0429 024D F8 10          LDI   SOT.L
0430 024F AC             PLO   C
0431 0250 AE             PLO   E
0432 0251 0C      PDLP   LDN   C       LOAD THROUGH C
0433 0252 32 5B          BZ    PD1     IGNORE IF ZERO
0434 0254 5D             STR   D       IF NOT SAVE
0435 0255 F8 00          LDI   0
0436 0257 5C             STR   C       CLEAR OUT CHARACTER
0437 0258 0D             LDN   D
0438 0259 5E             STR   E       STORE THROUGH E
0439 025A 1E             INC   E       INCREMENT E
0440 025B 1C      PD1    INC   C       INCREMENT C
0441 025C 9C             GHI   C
0442 025D FD E0          SDI   :E0     END OF MEMORY ?
0443 025F 3A 51          BNZ   PDLP
0444 0261 C0 00 61       LBR   MAIN
0445                    *
0446                    *********************************************
0447                    *
0448                    * MESSAGE SUBROUTINE
0449                    *
0450                    * ENTER WITH E REGISTER POINTING AT HIGHEST
                                ADDRESS TO BE WRITTEN TO
0451                    *
0452                    * LOAD E, ADDR TOP OF DISPLAY OR MEMORY
0453                    * LOAD 4, MSG SUB ADDRESS
0454                    * SEP 4
0455                    * MESSAGE OF 12 CHARACTERS
0456                    * RETURN
0457                    *
0458 0264 D0      MSGX   SEP   0       RETURN
0459 0265 F8 0C   MSG    LDI   12
0460 0267 A3             PLO   3       LOOP COUNT
0461 0268 F8 00   MSGLP  LDI   0
0462 026A 5E             STR   E       TO RESET CURSORS
0463 026B E0             SEX   0       PC USED AS INDEX
0464 026C 72             LDXA          GET CHAR FROM MESSAGE
0465 026D EE             SEX   E
0466 026E 73             STXD
0467 026F 23             DEC   3
0468 0270 83             GLO   3
0469 0271 3A 68          BNZ   MSGLP   FINISHED ?
0470 0273 30 64          BR    MSGX    RETURN
0471                    *
0472                    *
0473                    *
0474                    *********************************************
0475                    *
0476                    * GET CHARACTER SUBROUTINE
0477                    *
0478                    * RETURNS WITH 0 IF A CHARACTER IS NOT READY
0479                    * OTHERWISE RETURNS WITH CHARACTER IN D AND 8L
0480                    * CONTROL CODES HAVE BIT 6 SET
0481                    *
0482 0275 D0      GCKX   SEP   0       RETURN
0483 0276 ED      GETCH  SEX   D       X ADDRESSES TEMP
0484 0277 98             SHI   8       KEY PRESSED ?
0485 0278 3A 84          BNZ   GCH0
0486 027A 34 75          D1    GCHX    TEST IF KEY IS PRESSED
0487 027C 69      GCHB   INP   1       INPUT KEYS
0488 027D 98             GHI   8
0489 027E F1             OR            BUILD CHARACTER
0490 027F B8             PHI   8       SAVE SKELETON
0491 0280 F8 00          LDI   0       CHAR NOT READY YET
0492 0282 30 75          BR    GCHX
0493 0284 3C 7C   GCH0   BN1   GCHB    KEY STILL PRESSED ?
0494 0286 F8 00          LDI   0
0495 0288 A8             PLO   8       CLEAR LAST CHAR
0496 0289 98             GHI   8       NO - GET COMPLETED CHARACTER
0497 028A FA 3F          ANI   :3F     REMOVE BITS 6 & 7
```

```
0498 028C  F6              SHR            SHIFT OUT CONTROL BIT
0499 028D  B8              PHI   8        SAVE
0500 028E  33 BB           BDF   GCC      CONTROL ?
0501 0290  89              GLO   9        GET MODE
0502 0291  F6              SHR
0503 0292  33 B1           BDF   GA20     TEMP UC ?
0504 0294  F6              SHR
0505 0295  33 B6           BDF   GA40     NUM ?
0506 0297  F6              SHR
0507 0298  33 B1           BDF   GA20     UC LOCK ?
0508 029A  98              GHI   8        NO-GET CHARACTER
0509 029B  5D       GTRAN  STR   D        STORE SHIFTED CODE
0510 029C  F8 EB           LDI   LUT.L
0511 029E  F4              ADD            CODE TO LUT ADDRESS
0512 029F  AE              PLO   E
0513 02A0  F8 02           LDI   LUT.H
0514 02A2  7C 00           ADCI  0
0515 02A4  BE              PHI   E        ADDRESS IN LUT IN E
0516 02A5  0E              LDN   E        GET TRANSLATED CHARACTER
0517 02A6  A8              PLO   8        PUT IN CHAR STORE
0518 02A7  89              GLO   9        MODE
0519 02A8  FA FE    GCX1   ANI   :FE      RESET TEMP UC
0520 02AA  A9       GCX2   PLO   9        SAVE MODE
0521 02AB  F8 00           LDI   0
0522 02AD  B8              PHI   8        RESET KEY PRESSED FLAG
0523 02AE  88              GLO   8        GET CHARACTER
0524 02AF  30 75           BR    GCRX     AND EXIT
0525                *
0526 02B1  98       GA20   GHI   8
0527 02B2  FC 20           ADI   :20      ADD FOR UC
0528 02B4  30 9B           BR    GTRAN
0529 02B6  98       GA40   GHI   8
0530 02B7  FC 40           ADI   :40      NUM
0531 02B9  30 9B           BR    GTRAN
0532                *
0533 02BB  32 DC    GCC    BZ    GCS      SPACE
0534 02BD  98              GHI   8        CONTROL CODE
0535 02BE  FB 09           XRI   9        Y
0536 02C0  32 D7           BZ    GCY
0537 02C2  98              GHI   8
0538 02C3  FB 1B           XRI   :1B      P
0539 02C5  32 E1           BZ    GCP
0540 02C7  89              GLO   9
0541 02C8  F6              SHR
0542 02C9  98              GHI   8
0543 02CA  3B CE           BNF   GCC1     TEMP UC ?
0544 02CC  FC 20           ADI   :20      YES
0545 02CE  F6       GCC1   SHR
0546 02CF  3B D3           BNF   GCC2
0547 02D1  FC 02           ADI   2        FILL IN GAP OF THUMB KEY
0548 02D3  FC 60    GCC2   ADI   :60
0549 02D5  30 9B           BR    GTRAN
0550                *
0551 02D7  89       GCY    GLO   9
0552 02D8  F9 01           ORI   1        SET TEMP UC
0553 02DA  30 AA           BR    GCX2
0554 02DC  89       GCS    GLO   9
0555 02DD  FB 02           XRI   2        TOGGLE NUM
0556 02DF  30 A8           BR    GCX1
0557 02E1  89       GCP    GLO   9
0558 02E2  F6              SHR
0559 02E3  F8 00           LDI   0
0560 02E5  33 AA           BDF   GCX2     TEMP UC ? IF YES SET LC
0561 02E7  F8 04           LDI   4        UC LOCK.
0562 02E9  30 AA           BR    GCX2
0563                *
0564                *
0565                ****************************************
0566                * ASCI LOOK UP TABLE
0567                *
0568 02EB  20 73 65 LUT    DATA' set kirona.cydfugv,hjlwqb-mzx!"'  p LC
     02EE  74 20 6B
     02F1  69 72 6F
     02F4  6E 61 2E
     02F7  63 79 64
     02FA  66 75 67
     02FD  76 2C 68
     0300  6A 6C 77
```

```
       0303  71 62 2D
       0306  6D 7A 78
       0309  27 70
0569   030B  20 53 45                DATA ' SET KIRONA.CYDFUGV,HJLWQB-MZX','''','P UC
       030E  54 20 4B
       0311  49 52 4F
       0314  4E 41 2E
       0317  43 59 44
       031A  46 55 47
       031D  56 2C 48
       0320  4A 4C 57
       0323  51 42 2D
       0326  4D 5A 58
       0329  27 50
0570   032B  20 24 31                DATA ' $1+ /2;0"*.(?3467&,-=£:)8!9%X@5' NUM
       032E  2B 20 2F
       0331  32 3D 30
       0334  22 2A 2E
       0337  28 3F 33
       033A  34 36 37
       033D  26 2C 2D
       034C  3D 23 3A
       0343  29 38 21
       0346  39 25 58
       0349  40 35
0571   034B  00 88 80                DATA 0,:88,:80,'^','[',:8C,0,:8E CONTROL
       034E  5E 5B 8C
       0351  00 8E
0572   0353  FF 3E 82                DATA :FF,'>',:82,:8A,:84,:A,:86,o
       0356  8A 84 0A
       0359  86 00
0573   035B  00 FE 81                DATA 0,:FE,:81,:89,'[',:8D,0,:8F
       035D  89 5B 8D
       0361  00 8F
0574   0363  FF 3C 83                DATA :FF,'<',:83,:8B,:85,:9,:87,0
       0366  8B 85 09
       0369  87 00
0575                           *
0576                           *****************************************
0577                           *
0578                           * DISPLAY
0579                           *
0580                           *
0581   036B  D0             DISPEX  SEP  0
0582   036C  F8 0C          IDSP    LDI  :C
0583   036E  A3                     PLO  3       LOOP COUNT
0584   036F  F8 40 BE               LOAD E,:4000 DISPLAY ADRESS
       0372  F8 00 AE
0585   0375  9F                     GHI  F
0586   0376  FC                     PHI  C
0587   0377  8F                     GLO  F
0588   0378  AC                     PLO  C       RC=MEMA
0589   0379  99                     GHI  9       CHAR / CURSOR
0590   037A  FE                     SHL
0591   037B  3L BB                  BNF  DLI     CHARACTERS
0592   037D  F8 01                  LDI  1       CURSORS
0593   037F  B3                     PHI  3       CURSOR MASK
0594   0380  F8 00                  LDI  0
0595   0382  5D                     STR  D       RESET CURSOR DATA
0596   0383  0C             DL4     LDN  C
0597   0384  32 96                  BZ   DL2     BLANK
0598   0386  FF 20                  SMI  :20
0599   0388  3B 92                  LNF  FLASH   CONTROL
0600   038A  FF 21                  SMI  :21
0601   038C  3B 96                  BNF  DL2     TEST FOR UC
0602   038E  FF 1A                  SMI  :1A
0603   0390  33 96                  BDF  DL2
0604   0392  93             FLASH   GHI  3       YES - GET CURSOR MASK
0605   0393  LD                     SEX  D
0606   0394  F1                     OR           MASK OR DATA
0607   0395  5D                     STR  D       REPLACE CURSOR DATA
0608   0396  2C             DL2     DEC  C
0609   0397  23                     DEC  3
0610   0398  93                     GHI  3
0611   0399  FE                     SHL          SHIFT CURSOR MASK
0612   039A  B3                     PHI  3
0613   039B  FB 10                  XRI  :10     5 TH BIT ?
0614   039D  3A A7                  BNZ  DL3
```

```
0615 039F  F8 01         LDI   1            YES
0616 03A1  B3            PHI   3            RESET CURSOR MASK
0617 03A2  0D            LDN   D            CURSOR DATA
0618 03A3  5E            STR   E            DISPLAY
0619 03A4  F8 00         LDI   0
0620 03A6  5D            STR   D            RESET CURSOR DATA
0621 03A7  1E       DL3  INC   E            INC DISPLAY ADDRESS
0622 03A8  83            GLO   3
0623 03A9  3A 83         BNZ   DL4          LOOP COUNT 0 ?
0624 03AB  99       DL5  GHI   9
0625 03AC  FA 7F         ANI   :7F
0626 03AE  FF 01         SMI   L            DEC DELAY
0627 03B0  32 D6         BZ    DL6          EXPIRED ?
0628 03B2  FC 80         ADI   :80          NO - RESET FLAG
0629 03B4  30 DF         BR    DL11
0630 03B6  F8 28    DL6  LDI   :28          LONG DELAY FOR CHARS
0631 03B8  2A            DEC   A            DEC EXTERNAL DELAY
0632 03B9  30 DF         BR    DL11
0633                *
0634 03BB  F8 00    DL1  LDI   0
0635 03BD  5E            STR   E            RESET CURSOR
0636 03BE  0C            LDN   C            GET CHAR
0637 03BF  32 CF         BZ    DL8          BLANK MEMORY
0638 03C1  FF 20         SMI   :20
0639 03C3  3B CD         BNF   DL9          CONTROL
0640 03C5  FF 40         SMI   :40
0641 03C7  3B CB         BNF   DL10
0642 03C9  FF 20         SMI   :20          LOWER CASE
0643 03CB  FC 21    DL10 ADI   :21
0644 03CD  FC 1F    DL9  ADI   :1F
0645 03CF  FC A0    DL8  ADI   :A0
0646 03D1  5E            STR   B            CHAR TO DISPLAY
0647 03D2  1E            INC   E
0648 03D3  2C            DEC   C
0649 03D4  23            DEC   3
0650 03D5  83            GLO   3            LOOP COUNT
0651 03D6  3A BB         BNZ   DL1          DONE ?
0652 03D8  99            GHI   9            DEC DELAY
0653 03D9  FF 01         SMI   1
0654 03DB  3A DF         BNZ   DL11         DONE ?
0655 03DD  F8 88         LDI   :88          YES - SHORT DELAY FOR CURSORS
0656 03DF  B9       DL11 PHI   9
0657 03E0  30 6B         BR    DISPEX
0658                *
0659                *
0660                **********************************************
0661                *
0662                * PRINT ROUTINES
0663                *
0664                *
0665 03E2  F8 00    PRIN1 LDI  0
0666 03E4  30 E8          BR   PRIN3
0667 03E6  F8 01    PRIN2 LDI  1
0668 03E8  BA       PRIN3 PHI  A            LINE SPACE
0669 03E9  F8 00          LDI  0
0670 03EB  B3             PHI  3            MARGIN
0671 03EC  3E F1          BN3  PRIN0
0672 03EE  C0 05 2E       LBR  VDU          PRINTER OR VDU ?
0673                *
0674 03F1  F8 02 B4 PRIN0 LOAD 4, MSG
     03F4  F8 65 A4
0675 03F7  F8 40 BE       LOAD E, 400B
     03FA  F8 0B AE
0676 03FD  D4             SEP  4
0677 03FE                 ASCI 1
0678 03FE  D0 D2 C9       DATA 'PRINT    LEV 06'
     0401  CE D4 A0
     0404  CC C5 D6
0679 040A                 ASCI 0
0680                *
0681 040A  F8 04 B4       LOAD 4, PRINT     PRINT SUBROUTINE
     040D  F8 B5 A4
0682 0410  F8 05 B5       LOAD 5, PSUB      OUTPUT SUBROUTINE
     0413  F8 03 A5
0683 0416  0F       PRL1  LDN  F            LOOK FOR START
0684 0417  FF 3E          SMI  '>'
0685 0419  C2 04 29       LBZ  FF
0686 041C  8F             GLO  F
```

```
0687 041D  FF 10           SMI   SOT.L.
0688 041F  3A 26           BNZ   PRB1
0689 0421  9F              GHI   F
0690 0422  FF CO           SMI   SOT.H.
0691 0424  32 7C           BZ    PRXM      BACK TO START OF MEMORY
0692 0426  2F       PRB1   DEC   F
0693 0427  30 16           BR    PRL1
0694                *
0695 0429  F8 0C    FF     LDI   :C        FORM FEED
0696 042B  D4              SEP   4
0697 042C  88              GLO   8         KBD LAST CHAR
0698 042D  FB FF           XRI   :FF
0699 042F  32 AD           BZ    PHLT      HALT CODE ?
0700 0431  F8 00    PNL1   LDI   0
0701 0433  AA              PLO   A         RESET CHAR COUNT
0702 0434  93              GHI   3         GET MARGIN
0703 0435  A3       TAB1   PLO   3         PRESET TAB COUNT
0704 0436  5D              STR   D
0705 0437  8A       PNL2   GLO   A         CHAR COUNT
0706 0438  ED              SEX   D
0707 0439  F7              SM              ARE WE THERE YET ?
0708 043A  33 42           BPZ   PNEX
0709 043C  F8 20           LDI   :20       PRINT SPACE
0710 043E  D4              SEP   4
0711 043F  1A              INC   A         INC CHAR COUNT
0712 0440  30 37           BR    PNL2      AND AGAIN
0713 0442  D2       PNEX   SEP   2         KEEP KBD GOING
0714 0443  1F              INC   F
0715 0444  9F              GHI   F
0716 0445  FF E0           SMI   :E0
0717 0447  32 73           BZ    PREOM     END OF MEM
0718 0449  0F              LDN   F
0719 044A  32 74           BZ    PRX       BLANK
0720 044C  FB 5B           XRI   '['
0721 044E  32 90           BZ    CRLF
0722 0450  0F              LDN   F
0723 0451  FB 3E           XRI   '>'
0724 0453  32 42           BZ    PNEX      SKIP START CODES
0725 0455  0F              LDN   F
0726 0456  FB 3C           XRI   '<'
0727 0458  32 74           BZ    PRX
0728 045A  0F              LDN   F
0729 045B  FB 5E           XRI   '^'
0730 045D  32 9E           BZ    TAB
0731 045F  0F              LDN   F
0732 0460  FB 0A           XRI   :A        MARGIN SELECT
0733 0462  32 A3           BZ    MSEL
0734 0464  0F              LDN   F
0735 0465  FB 09           XRI   9         MARGIN RESET
0736 0467  32 A8           BZ    MRST
0737 0469  0F              LDN   F
0738 046A  FB 20           XRI   ' '
0739 046C  32 84           BZ    SPA
0740 046E  0F       PN1    LDN   F         GET CHARACTER
0741 046F  D4              SEP   4         PRINT IT
0742 0470  1A              INC   A         CHAR COUNT
0743 0471  30 42           BR    PNEX
0744                *
0745 0473  2F       PREOM  DEC   F
0746 0474  36 7F    PRX    B3    VDUX      PRINTER OR VDU ?
0747 0476  F8 0D           LDI   :D        CR
0748 0478  D4              SEP   4
0749 0479  F8 0A           LDI   :A        LF
0750 047B  D4              SEP   4
0751 047C  C0 00 61 PRXM   LBR   MAIN
0752                *
0753 047F  F8 00    VDUX   LDI   0         PUT ZERO IN 7H
0754 0481  B7              PHI   7
0755 0482  30 7C           BR    PRXM
0756                *
0757 0484  8A       SPA    GLO   A         CHAR COUNT
0758 0485  FF 32           SMI   50        FULL YET ?
0759 0487  3B 6E           BM    PN1
0760 0489  1F       SP1    INC   F         YES - TEST FOR MULTIPLE
                                                    SPACES
0761 048A  0F              LDN   F
0762 048B  FF 20           SMI   ' '
0763 048D  32 89           BZ    SP1
```

```
0764 048F  2F              DEC   F
0765 0490  F8 OD     CRLF  LDI   :D              CR
0766 0492  D4              SEP   4
0767 0493  F8 OA           LDI   :A              LF
0768 0495  D4              SEP   4
0769 0496  9A              GHI   A               DOUBLE ?
0770 0497  32 2C           BZ    PNL
0771 0499  F8 OA           LDI   :A              LF
0772 049B  D4              SEP   4
0773 049C  30 2C           BR    PNL
0774                  *
0775 049E  83        TAB   GLO   3               TAB POSITION
0776 049F  FC 05           ADI   5
0777 04A1  30 35           BR    TAB1
0778                  *
0779 04A3  93        MSEL  GHl   3               MARGIN
0780 04A4  FC 05           ADI   5
0781 04A6  30 AA           BR    MS1
0782 04A8  F8 00     MRST  LDI   0
0783 04AA  B3        MS1   PHI   3
0784 04AB  30 42           BR    PNEX
0785                  *
0786 04AD  D2        PHLT  SEP   2               WAIT FOR KEY
0787 04AE  FB 86           XRI   :86             PRINT
0788 04B0  3A AD           BNZ   PHLT
0789 04B2  30 31           BR    PNLI
0790                  *
0791                  *   PRINT BYTE SUBROUTINE
0792                  *
0793 04B4  D0        PRINX SEP   0
0794 04B5  AE        PRINT PLO   E               SAVE CHAR
0795 04B6  FB OC           XRI   :C
0796 04B8  32 F2           BZ    PFF
0797 04BA  8E              GLO   E
0798 04BB  FB OD           XRI   :D
0799 04BD  32 DE           BZ    PCR
0800 041F  8E              GLO   E
0801 04CO  FB OA           XRI   :A
0802 04C2  32 D6           BZ    PLF
0803 04C4  8E              GLO   E
0804 04C5  FB 20           XRI   :20
0805 04C7  32 CD           BZ    PSPA
0806 04C9  F8 20           LDI   :20             CHAR STROBE
0807 04CB  BL              PHI   E
0808 04CC  D5              SEP   5
0809 04CD  F8 40 BE  PSPA  LOAD  E,:4006         SPACE VALUE
     04D0  F8 06 AE
0810 04D3  D5        PLF1  SEP   5
0811 04D4  30 B4           BR    PRINX
0812                  *
0813 04D6  F8 80 BE  PLF   LOAD  E,:8008
     04D9  F8 08 AE
0814 04DC  30 D3           BR    PLF1
0815                  *
0816 04DE  F8 44 BE  PCR   LOAD  E,:4400         CARR LEFT
     04D1  F8 00 AE
0817 04B4  8A        PCRL  GLO   A               CHAR COUNT
0818 04E5  32 D3           BZ    PLF1
0819 04E7  8E              GLO   E               BUILD
0820 04E8  FC 06           ADI   6
0821 04EA  AE              PLO   E
0822 04EB  9E              GHI   E
0823 04EC  7C 00           ADCI  0
0824 04EE  BE              PHI   E
0825 04EF  2A              DEC   A
0826 04F0  30 E4           BR    PCRL
0827                  *
0828 04F2  F8 10 BE  PFF   LOAD  E,:1000         RESTORE
     04F5  F8 00 AE
0829 04F8  D5              SEP   5
0830 04F9  F8 40 BE        LOAD  B,:4030         8 SPACE MARGIN
     04FC  F8 30 AE
0831 04FF  C0 04 D3        LBR   PLFI
0832                  *
0833                  * PRINTER INTERFACE SUBROUTINE
0834                  *
0835 0502  D4        PSUBX SEP   4
0836 0503  E5        PSUB  SEX   5
```

```
0837 0504  65           OUT   5
0838 0505  00           DATA  0
0839 0506  64           OUT   4
0840 0507  00           DATA  0
0841 0508  35 08   PSL1 B2    PSL1    PRINTER READY ?
0842 050A  F8 00        LDI   0
0843 050C  A6           PLO   6       BIT COUNT
0844 050D  8E           GLO   E
0845 050E  7B      PSL5 SLQ
0846 050F  F6           SLR
0847 0510  33 13        BDF   PSL2    BIT = 1 ?
0848 0512  7A           REQ
0849 0513  B6      PSL2 PHI   6       SAVE SHIFTED BITS
085C 0514  16           INC   6       INC BIT COUNT
0851 0515  86           GLO   6
0852 0516  FD 08        SDI   :08
0853 0518  32 27        BZ    PSL3    8 BITS DONE ?
0854 051A  86           GLO   6
0855 051B  FD 10        SDI   :10
0856 051D  3A 29        BNZ   PSL4    16 BITS ?
0857 051F  7A           REQ
0858 0520  66           OUT   6       SEND STROBE
0859 0521  00           DATA  0
0860 0522  67           OUT   7
0861 0523  00           DATA  0
0862 0524  00 05 02     LBR   PSUBX
0803 0527  9E      PSL3 GHI   E
0804 0528  B6           PHI   6
0865 0529  96      PSL4 GHI   6
0868 052A  7A           REQ
0867 052B  C005 0E      LBR   PSL5
0868                *
0869                ************************************
0870                *
0871                * VDU ROUTINES
0872                *
0873 052E  F8 05 B4 VDU  LOAD  4, VCHAR
     0531  F8 56 A4
0874 0534  F8 05 B5      LOAD  5, VBYTE
     0537  F8 A8 A5
0875 053A  9A            GHI   A
0876 053D  3A 46         BNZ   V1       'PRINT'1 OR 2 ?
0877 053D  97            GHI   7
0878 053L  C2 00 61      LBZ   MAIN     0 FOR END CODE - IGNORE
0879 0541  B6            DRI   6        COPY 7 to 6
0880 0543  87            GLO   7
0881 0543  FF 01         SM1   1
0882 0545  A6            PLO   6
0883 0546  93      V1    GHI   3        ZERO
0884 0547  A7            PLO   7        LINE COUNT
0885 0548  96            GHI   6        COPY 6 TO F
0886 0549  BF            PHI   F
0941 0594  87            GLO   7
0942 0595  FD 08         SDI   8
0943 0597  32 9B         BZ    VEND     8 LINES ?
0944 0599  30 7C         BR    VCD1     GO TO CONTROL DELAY
0945               *
0946 059B  9F      VEND  GHI   F        COPY F TO 7
0947 059C  B7            PHI   7
0948 059D  8F            GLO   F
0949 059E  A7            PLO   7
0950 059F  17            INC   7        AND INCREMENT
0951 05A0  F8 00 B0 VEND1 LOAD 0, MAIN   RETURN TO MAIN
     05A3  F8 61 A0
0952 05A6  D0            SEP   0
0953               *
0954               * VDU INTERFACE SUBROUTINE
0955               *
0956 05A7  D4      VBYX  SEP   4
0957 05A8  B5      VBYTE SEX   5
0958 05A9  7A            REQ
0959 05AA  64            OUT   4
0960 05AB  00            DATA  0
0961 05AC  66            OUT   6
0962 05AD  00            DATA  0
0963 05AE  F8 08         LDI   8
0964 05B0  AB            PLO   B        BIT COUNT
0965 05B1  8B      VB1   GLO   B
```

```
0966 05B2 2B            DEC  B
0967 05B3 32 C3         BZ   VB3      DONE ?
0968 05B5 8E            GLO  E        GET CHAR
0969 05B6 F6            SHR           SHIFT
0970 05B7 AE            PLO  E        AND SAVE
0971 05B8 3B BB         BNF  VB2
0972 05BA 7B            SEQ
0973 05BB 65      VB2   OUT  5        SET BIT CLOCK
0974 05BC 00            DATA 0
0975 05BD C4            NOP
0976 05BE 64            OUT  4        RESET BIT CLOCK
0977 05BF 00            DATA 0
0978 05C0 7A            REQ
0979 05C1 30 B1         BR   VB1
0980 05C3 67      VB3   OUT  7        BYTE STROBE
0981 05C4 00            DATA 0
0982 05C5 C4            NOP
0983 05C6 66            OUT  6
0984 05C7 00            DATA 0
0985 05C8 F8 01         LDI  1        ??? SHORT DELAY FOR CHARS
0986 05CA FF 01   VB4   SMI  1
0987 05CC 3A CA         BNZ  VB4
0988 05CE 30 A7         BR   VBYX
0989                *
0990                ******************************************
0991                *
0992                * CASSETTE ROUNTINES
0993                *
0994                ******************************************
0995                *
0996                * CASSETTE SEND ROUNTINE
0997                *
0998                * FOR DIGITAL INTERFACE
0999                *
1000                *
1001                * SEND BIT ROUTINE
1002                *
1003 05D0 35 D0    STOP  B2   STOP     WAIT FOR CLOCK
1004 05D2 7B            SEQ            START CHARGING
1005 05D3 65            OUT  5         VIA STOPS GATE
1006 05D4 00            DATA 0
1007 05D5 66            OUT  6
1008 05D6 00            DATA 0
1009 05D7 35 D7    STP1  B2   STP1     WAIT FOR END OF CLOCK
1010 05D9 C4            NOP
1011 05DA C4            NOP
1012 05DB 35 DB    STP2  B2   STP2     WAIT FOR CLOCK
1013 05DD C4            NOP
1014 05DE C4            NOP
1015 05DF 35 DF    STP3  B2   STP3     WAIT FOR END OF CLOCK
1016 05E1 7A            REQ            START DISCHARGE
1017 05E2 C4            NOP
1018 05E3 35 E3    STP4  B2   STP4     WAIT FOR CLOCK
1019 05E5 C4            NOP
1020 05E6 C4            NOP
1021 05E7 35 E7    STP5  B2   STP5     WAIT FOR END OF CLOCK
1022 05E9 C0 06 0C      LBR  STPR     GO BACK
1023                *
1024 05EC 35 EC    ZERO  B2   ZERO     WAIT FOR CLOCK
1025 05EE 7B            SEQ            START CHARGING
1026 05EF 64            OUT  4         VIA O's GATE
1027 05F0 00            DATA 0
1028 05F1 67            OUT  7
1029 05F2 00            DATA 0
1030 05F3 35 F3    ZRO1  B2   ZRO1     WAIT FOR END OF CLOCK
1031 05F5 C4            NOP
1032 05F6 C4            NOP
1033 05F7 35 F7    ZRO2  B2   ZRO2     WAIT FOR CLOCK
1034 05F9 7A            REQ            START DISCHARGE
1035 05FA C4            NOP
1036 05FB 35 FB    ZRO3  B2   ZRO3     WAIT FOR END OF CLOCK
1037 05FD C0 06 21      LBR  OZR      GO BACK
1038                *
1039 0600 35 00    ONES  B2   ONES     WAIT FOR CLOCK
1040 0602 7B            SEQ            START CHARGING
1041 0603 64            OUT  4         VIA 1's GATE
1042 0604 00            DATA 0
1043 0605 66            OUT  6
```

```
1044 0606  00                    DATA   0                   WAIT FOR END OF CLOCK
1045 0607  35 07        ONE1     B2     ONE1                START DISCHARGE
1046 0609  7A                    REQ                        GO BACK
1047 060A  30 21                 BR     OZR
1048                   *
1049                   * SEND WORD ROUTINE
1050                   *
1051 060C  D0           STPR     SEP    0                   RETURN TO CALLER
1052 060D  E0           SEWO     SEX    C
1053 060E  72                    LDXA                       BIT COUNT
1054 060F  B3                    PHI    3
1055 0610  72                    LDXA
1056 0611  E4                    SEX    4
1057 0612  A3                    PLO    3
1058 0613  F8 80                 LDI    :80
1059 0615  FE                    SHL                        MAKE DF=1
1060 0616  0F                    LDN    F                   LOAD DATA
1061 0617  A9                    PLO    9                   SAVE IT
1062 0618  89           SEW1     GLO    9                   GET DATA
1063 0619  7E                    RSHL                       TEST BIT
1064 061A  A9                    PLO    9                   SAVE RESULT
1065 061B  C3 06 00              LBDF   ONES                MAKE A ONE
1066 061E  C0 05 EC              LBR    ZERO                MAKE A ZERO
1067                   *
1068 0621  23           OZR      DEC    3                   BIT COUNT - 1
1069 0622  93                    GHI    3                   CHECK BIT COUNT
1070 0623  3A 18                 BNZ    SEW1                IF NOT ZERO
1071 0625  83                    GLO    3                   GO BACK AND
1072 0626  3A 18                 BNZ    SEW1                SEND ANOTHER BIT
1073                   *
1074 0628  C0 05 D0              LBR    STOP                MAKE A STOP BIT
1075                   *
1076                   *
1077                   *
1078 062B  F8 02 B4     CASSW    LOAD   4, MSG
     062E  F8 65 A4
1079 0631  F8 40 BE              LOAD   E,:400B
     0634  F8 0B AE
1080 0637  D4                    SEP    4
1081 0638                        ASC1   1
1082 0638  D4 C1 D0              DATA   'TAPE               WRITE '
     063B  C5 A0 D7
     063E  D2 C9 D4
     0641  C5 A0 A0
1083 0644  F8 06 B4              LOAD   4, SEWO
     0647  F8 0D A4
1084 064A  0F           SECL     LDN    F                   GET DATA
1085 064B  FB 3E                 XRI    :3E                 CHECK FOR START CODE
1086 064D  32 5C                 BZ     LRI                 START SENDING
1087 064F  8F                    GLO    F                   CHECK FOR START OF MEMORY
1088 0650  FB 10                 XRI    :10
1089 0652  3A 59                 BNZ    SSCJ
1090 0654  9F                    GHI    F
1091 0655  FE C0                 XRI    :C0
1092 0657  32 5C                 BZ     LRI                 START SENDING
1093 0659  2F           SSCJ     DEC    F                   F - 1
1094 065A  30 4A                 BR     SSCL                LOOP AGAIN
1095 065C  F8 FF        LRI      LDI    :FF                 FOR RUN IN
1096 065E  5F                    STR    F
1097 065F  D4                    SEP    4
1098 0660  02                    DATA   :02
1099 0661  00                    DATA   :00
1100 0662  F8 3E                 LDI    :3E                 RELOAD START CODE
1101 0664  5F                    STR    F
1102 0665  0F           MDSL     LDN    F                   GET DATA
1103 0666  D4                    SEP    4                   SEND IT
1104 0667  00                    DATA   :00
1105 0668  08                    DATA   :08                 (ITS 8 BITS)
1106 0669  0F                    LDN    F                   GET DATA AGAIN
1107 066A  FB 3C                 XRI    :3C                 CHECK FOR END CODE
1108 066C  C2 06 7A     LBNZ     LBZ    LROA                CONTINUE
                                 DEC    F
                                 XRI    :3C
                                 BZ     LRO
                                 INC    F
1109 066F  9F           LROA     GHI    F                   CHECK FOR END OF MEMORY
1110 0670  FD E0                 XRI    :E0
1111 0672  C2 06 79              LBZ    LROP                GO TO RUN OUT
```

```
1112 0675  1F                 INC   F          F+ 1
1113 0676  C0 06 65            LBR   MDSL       GO BACK FOR MORE
1114 0679  2F         LROP    DEC   F          GET BACK INTO VALID MEMORY
1115 067A  F8 FF      LRO     LDI   :FF
1116 067C  5F                 STR   F          FOR RUN OUT
1117 067D  D4                 SEP   4          SEND IT
1118 067E  02                 DATA  :02
1119 067F  00                 DATA  :00
1120 0680  F8 3C              LDI   :3C        RELOAD END CODE
1121 0682  5F                 STR   F
1122 0683  C0 00 61           LBR   MAIN
1123                  *
1124                  ***********************************************
1125                  *
1126                  * CASSETTE READ ROUTINE
1127                  *
1128                  ***********************************************
1129                  *
1130 0686  2F         CASSI   DEC   F
1131 0687  F8 02 D4   CASSR   LOAD  4,MSG
     068A  F8 65 A4
1132 068D  F8 40 BE           LOAD  E,:400B
     0690  F8 0B AE
1133 0693  D4                 SEP   4
1134 0694                     ASCI  0
1135 0694  54 41 50           DATA  'TAPE      READ '
     0697  45 20 52
     069A  45 41 44
     069D  20 20 20
1136 06A0  F8 06 B4           LOAD  4 RTAP
     06A3  F8 AA A4
1137 06A6  D4                 SEP   4          READ IN TAPE
1138 06A7  C0 02 49           LPR   PACK
1139                  *
1140 06AA  F8 06 B0   RTAP    LOAD  0,RTAPT    TEMP GET OUT
     06AD  F8 B1 A0
1141 06B0  D0                 SEP   0
1142 06B1  C0 00 61   RTAPT   LBR   MAIN
1143                  *
1144                          END

0000  ERRORS
```

| | | | | | | | |
|---|---|---|---|---|---|---|---|
| BACKC | 0158 | BACKS | 010B | CASSI | 0686 | CASSR | 0687 | CASSW | 062E |
| CNLI  | 0168 | CNLM  | 0166 | CONT  | 0160 | CRLF  | 0490 | DECPT | 0187 |
| DEL   | 01EC | DEL1  | 01F8 | DELC  | 01D3 | DELC1 | 01D9 | DELC2 | 01DF |
| DELEX | 01EB | DELS  | 01C8 | DISP  | 036C | DISPE | 036B | DL1   | 03BF |
| DL10  | 03CB | DL11  | 03DF | DL2   | 0396 | DL3   | 03A7 | DL4   | 0383 |
| DL5   | 03AB | DL6   | 03D6 | DL8   | 03CF | DL9   | 03CD | DP1   | 0191 |
| DP2   | 0197 | DP3   | 0199 | DPEX  | 0186 | ENTRY | 0000 | FF    | 0429 |
| FLASH | 0392 | FORWC | 0150 | FORWS | 00F9 | GA20  | 02B1 | GA40  | 02BE |
| GCC   | 02BB | GCC1  | 02CE | GCC2  | 02D3 | GCH0  | 0284 | GCHB  | 027C |
| GCHX  | 0275 | GCP   | 02E1 | GCS   | 02DC | GCX1  | 02A8 | GCX2  | 02AA |
| GCY   | 02D7 | GETCH | 0276 | GTRAN | 029B | INCPT | 0174 | INSC  | 023B |
| INSL1 | 0230 | INSLP | 0222 | INSRT | 0200 | IP1   | 0183 | IP2   | 017F |
| IPEX  | 0173 | JMPT  | 00CA | LB1   | 007B | LBATT | 0077 |
| LRI   | 065C | LRO   | 067A | LRP   | 0679 | LUT   | 02EB | MAIN  | 0061 |
| MAIN1 | 0066 | MAIN2 | 006A | MCONT | 00BD | MDSL  | 0665 | MFI   | 00B6 |
| MFULL | 009C | MRST  | 04A8 | MS1   | 04AA | MSEL  | 04A3 | MSG   | 0265 |
| MSGLP | 0268 | MSGX  | 0264 | MSTOR | 0073 | ONE1  | 0607 | ONES  | 0600 |
| OSR   | 0621 | PACK  | 0249 | PACKJ | 01E8 | PCR   | 04DE | PCRL  | 04E4 |
| PD1   | 025B | PDLP  | 0251 | PFF   | 04F2 | PHLT  | 04AD | PLF   | 04D6 |
| PLF1  | 04D3 | PN1   | 046E | PNEX  | 0442 | PNL   | 042C | PNL1  | 0431 |
| PNL2  | 0437 | PRB1  | 0426 | PREOM | 0473 | PRINO | 03F1 | PRIN1 | 03E2 |
| PRIN2 | 03E6 | PRIN3 | 03E8 | PRINT | 04B5 | PRINX | 04B4 | PRLI  | 0416 |
| PRX   | 0474 | PRXM  | 047C | PSL1  | 0508 | PSL2  | 0513 | PSL3  | 0527 |
| PSL4  | 0529 | PSL5  | 050E | PSPA  | 04CD | PSUB  | 0503 | PSUBX | 0502 |
| PU1   | 0215 | PU2   | 021F | PULP  | 0209 | RTAP  | 06AA | RTAPT | 06B1 |
| SEW1  | 0618 | SEW0  | 060D | SOT   | C010 | SP1   | 0489 | SPA   | 0484 |
| SSCJ  | 0659 | SSCL  | 064A | START | 0055 | STOP  | 05D0 | STP1  | 05D7 |
| STP2  | 05DB | STP3  | 05DF | STP4  | 05E3 | STP5  | 05E7 | STPR  | 060C |
| TAB   | 049E | TAB1  | 0435 | TEMP  | C000 | V1    | 0546 | VB1   | 05B1 |
| VB2   | 05BB | VB3   | 05C3 | VB4   | 05CA | VBYTE | 05A8 | VBYX  | 05A7 |
| VCD1  | 057C | VCD2  | 057F | VCE1  | 0572 | VCHAR | 0556 | VCHX  | 0555 |
| VCR   | 057B | VDU   | 052E | VDUX  | 047F | VEND  | 059B | VEND1 | 05A0 |
| VFF   | 0585 | VFF1  | 058C | VLF   | 0592 | VSTRT | 005B | VTST  | 0102 |
| WBLP  | 01A9 | WEND  | 01C4 | WFS   | 0050 | WIPE  | 019B | WIPE1 | 01B2 |
| WLP   | 01B6 | ZBLP  | 014A | ZERO  | 05EC | ZIP   | 011A | ZIP1  | 011C |
| ZIPB  | 0144 | ZIPS  | 0116 | ZLP   | 0120 | ZR01  | 05F3 | ZRO   | 05F7 |
| ZRO3  | 05FB | ZX    | 0135 | ZX1   | 0124 | ZX2   | 0140 |

It is believed that the operator code illustrated by FIG. 4 is easily memorized because, although the individual graphic correlation between a selected key or keys-combination for a given alphabet letter might be changed, there is an overall graphic correlation that enables a majority of the alphabet letters to be so represented and this provides a learning framework.

It has been found that use of such an operator code is an effective aid in the use of the word-processor because it is easily and speedily memorable.

The use of what is basically a five key keyboard, the additional thumb key providing a second five key keyboard, with the word-processor of this invention has the advantages of providing a simpler, smaller and cheaper construction than that of a conventional keyboard because the need for a separate key for each character or control instruction is obviated and the speed of use of this chord keyboard is comparable with a conventional keyboard as the fingers do not need to be moved from one key to another and the thumb has only to move between two keys and does not have to so move when alphabet letters are being inputted to the word-processor.

Although a right-hand keyboard device has been described and illustrated, it is apparent that a "mirror-image" left-handed device could equally well be produced.

A liquid crystal or other low power consumption alpha-numeric display could be used instead of the LED display 13. An important feature of a preferred embodiment of the invention is that the keys are not designated or identified. Thus, a new operator is forced to touch-type. A sighted operator additionally uses the visual feed-back from the display device in an eye-brain visual interaction in learning to use the word-processor. It has, however, been discovered that practised operators or non-sighted operators effectively operate the word-processor without reference to the display device by using tactile hand-brain interaction. This is an inherent human capability, for example a proficient pianist does not need to look at the keyboard when playing a chord on a piano. Similarly, a proficient operator does not need to look at the word-processor to operate it and thus the word-processor can be used in areas and situations not previously available to conventional word-processors such as when travelling, for taking notes at lectures, during business conferences etc.

What is claimed and desired to be secured by Letters Patent is:

1. A hand portable word-processor which can be held by one of an operator's hands to be operated only by the other hand or supported against a surface for operation only by one hand, comprising a manually operable input keyboard having four non-thumb finger keys and a first thumb key, means responsive to operation of the first thumb key and the non-thumb keys for generating different coded character signals each representing a different character in a particular alphabetic system, the number of said coded signals which are generatable by operation of said keys greatly exceeding the number of the keys themselves, a casing supporting said means and said keyboard, a microprocessor forming a part of said means, and a second thumb key forming a part of said keyboard and operable with pre-selected ones of said non-thumb finger keys to supply process instructions to said microprocessor to process said coded character signals, said first and second thumb keys and said non-thumb keys being positioned on said casing for operation with a single hand.

2. A hand portable word-processor, which can be held by one of an operator's hands to be operated only by the other hand or supported against a surface to be operated only by one hand, comprising a manually operable input keyboard having four non-thumb finger keys and at least one thumb key, means responsive to operation of said keys for producing coded signals each representing a different character in a particular alphabetic system, and a casing supporting said means and said keyboard, said casing having front and rear oppositely facing ends and a top wall extending between said ends and formed with an exterior intermediate surface which is spaced from said ends and which is sloped rearwardly toward said rear end to face generally forwardly in the direction of said front end, all of the non-thumb keys in said keyboard lying along said intermediate surface and being arranged along an arcuate line at positions where the finger tips of an operator's hand overlie said non-thumb keys when the palm of the operator's hand is positioned over said top wall at a location which lies rearwardly of said intermediate surface.

3. The hand portable word-processor defined in claim 2 wherein said casing is further formed with an exterior side surface which is sloped to face upwardly and laterally away from said casing, said thumb key being positioned at said side surface at a location where the thumb tip of one of the operator's hands overlies said thumb key when the non-thumb finger tips of said one of said hands overlies said non-thumb keys.

4. The hand portable word-processor defined in claim 3 wherein said side surface is positioned rearwardly of said intermediate surface and lies in an envelope which transversely intersects said intermediate surface.

5. The hand portable word-processor defined in any one of the preceding claims 3-4 wherein said intermediate and side surfaces are contained in an envelope having the configuration of a pyramid.

6. The hand portable word-processor defined in claim 3 wherein said casing is formed with a further exterior surface extending along said rear end and sloped in a direction to face upwardly and rearwardly relative to said casing such that said intermediate and further surfaces are oppositely facing and converge toward each other in a direction extending upwardly from said casing, said further surface being spaced rearwardly from said intermediate surface to provide a rest surface for the heel of the operator's hand when the non-thumb finger tips of that hand are positioned to overlie said non-thumb keys.

7. The hand portable word-processor defined in claim 6 wherein said side surface extends between said intermediate and further surfaces.

8. The hand portable word-processor defined in any one of the preceding claims 6-7 wherein said intermediate, side and further surfaces lie in an envelope having the configuration of a pyramid.

9. A hand portable word-processor which can be held by one of an operator's hands to be operated only by the other hand or supported against a surface for operation only by one hand, comprising an input keyboard having a set of five manually operable finger keys, each of the keys in said set being arranged for operation with a different finger of only one hand, means responsive to operation of said keys for generating different coded electrical outputs each representing a different character in a particular alphabetic system, the number of said coded outputs which are generatable by operation of said keys greatly exceeding the number of the keys themselves, a casing supporting said means and said keyboard, a microprocessor forming a part of said means, and a control key forming a part of said keyboard and operable with pre-selected ones of the keys in said set to supply process instructions to said microprocessor to process said coded outputs, said control key being positioned on said keyboard for operation by a pre-selected one of the fingers on said one hand.

* * * * *

UNITED STATES PATENT AND TRADEMARK OFFICE
CERTIFICATE OF CORRECTION

PATENT NO. : 4,442,506
DATED : April 10, 1984
INVENTOR(S) : Cyril Endfield

It is certified that error appears in the above-identified patent and that said Letters Patent is hereby corrected as shown below:

```
Cover page, opposite "Attorney, Agent, or Firm", change
"LeBland" to --LeBlanc--.
Column 6, line 8, underline "D".
Column 6, in the chart, opposite "Insertion" and following
"Flashing symbol", insert the symbol ⊠    .
Column 6, in the chart opposite "Tabulate" and under the
heading "DISPLAY" insert the symbol ∧ .
```

Signed and Sealed this

Fifth Day of March 1985

[SEAL]

*Attest:*

DONALD J. QUIGG

*Attesting Officer*      *Acting Commissioner of Patents and Trademarks*